US010097748B2

(12) United States Patent
Hayashi

(10) Patent No.: US 10,097,748 B2
(45) Date of Patent: Oct. 9, 2018

(54) CONTROL APPARATUS, IMAGE PICKUP APPARATUS, CONTROL METHOD, AND NON-TRANSITORY COMPUTER-READABLE STORAGE MEDIUM WHICH ARE CAPABLE OF CORRECTING DEFOCUS AMOUNT

(71) Applicant: CANON KABUSHIKI KAISHA, Tokyo (JP)

(72) Inventor: Soichiro Hayashi, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 202 days.

(21) Appl. No.: 15/133,372

(22) Filed: Apr. 20, 2016

(65) Prior Publication Data

US 2016/0316133 A1    Oct. 27, 2016

(30) Foreign Application Priority Data

Apr. 27, 2015   (JP) ................. 2015-090075

(51) Int. Cl.
*H04N 5/232*      (2006.01)
*H04N 5/217*      (2011.01)
*H04N 5/225*      (2006.01)

(52) U.S. Cl.
CPC ......... *H04N 5/23212* (2013.01); *H04N 5/217* (2013.01); *H04N 5/2256* (2013.01); *H04N 5/23209* (2013.01); *H04N 5/23293* (2013.01)

(58) Field of Classification Search
CPC .. H04N 5/23212; H04N 5/2256; H04N 5/217; H04N 5/23209; H04N 5/23293
See application file for complete search history.

(56) References Cited

U.S. PATENT DOCUMENTS

| 5,664,236 | A | 9/1997 | Utagawa | |
|---|---|---|---|---|
| 9,146,449 | B2 | 9/2015 | Inoue | |
| 2002/0130959 | A1* | 9/2002 | McGarvey | H04N 9/735 348/223.1 |
| 2004/0201766 | A1* | 10/2004 | Funston | H04N 5/2351 348/333.02 |
| 2005/0158044 | A1* | 7/2005 | Ide | G03B 17/14 396/71 |

FOREIGN PATENT DOCUMENTS

| CN | 1645233 A | 7/2005 |
|---|---|---|
| JP | H08-062484 A | 3/1996 |
| JP | 2006-072084 A | 3/2006 |
| JP | 2013-080187 A | 5/2013 |

OTHER PUBLICATIONS

Office Action dated Jul. 30, 2018, in Chinese Patent Application No. 201610266799.8.

* cited by examiner

*Primary Examiner* — Nelson D. Hernández Hernández
(74) *Attorney, Agent, or Firm* — Fitzpatrick, Cella, Harper & Scinto

(57) ABSTRACT

A control apparatus includes an acquisition unit (acquirer 210*a*) which acquires light source information relating to a light source that illuminates an object, a setting unit (setter 210*b*) which sets correction information of a defocus amount corresponding to the light source information according to an operation by a user, and a memory unit (memory 240) which stores the light source information and the correction information while being correlated with each other.

11 Claims, 5 Drawing Sheets

CONTROL APPARATUS, IMAGE PICKUP APPARATUS, CONTROL METHOD, AND NON-TRANSITORY COMPUTER-READABLE STORAGE MEDIUM WHICH ARE CAPABLE OF CORRECTING DEFOCUS AMOUNT

BACKGROUND OF THE INVENTION

Field of the Invention

The present invention relates to an image pickup apparatus which is capable of correcting a defocus amount detected based on a focus signal.

Description of the Related Art

In order to perform focus control with higher accuracy, Japanese Patent Laid-open No. 2013-80187 discloses an image pickup apparatus which stores a correction value (micro-adjustment correction value) that a user can arbitrarily set, in addition to an adjustment value of a defocus amount that is previously stored in a non-volatile memory in the factory shipment. Japanese Patent Laid-open No. 2006-72084 discloses a camera system which determines a type of a light source illuminating an object and corrects a defocus amount depending on a previously-stored chromatic aberration.

However, in the image pickup apparatus disclosed in Japanese Patent Laid-open No. 2013-80187, the correction value that the user can arbitrarily set is only one value for each image pickup lens. Accordingly, when a light source which illuminates the object in photographing is different from a light source which illuminates the object in setting the correction value for focusing, it is difficult to perform highly-accurate autofocus control.

It can be considered that the defocus amount is corrected by the configuration disclosed in Japanese Patent Laid-open No. 2006-72084 after the defocus amount is corrected by the configuration disclosed in Japanese Patent Laid-open No. 2013-80187. However, if a path of an optical system from the image pickup lens to a sensor that detects the defocus amount is displaced or the chromatic aberration with respect to a type of the light source that illuminates the object determined in photographing is previously stored, the correction accuracy of the defocus amount is deteriorated.

SUMMARY OF THE INVENTION

The present invention provides a control apparatus, an image pickup apparatus, a control method, and a non-transitory computer-readable storage medium which are capable of setting a correction value of a defocus amount by a user arbitrarily depending on a light source that illuminates an object.

A control apparatus as one aspect of the present invention includes an acquisition unit configured to acquire light source information relating to a light source that illuminates an object, a setting unit configured to set correction information of a defocus amount corresponding to the light source information according to an operation by a user, and a memory unit configured to store the light source information and the correction information while being correlated with each other.

An image pickup apparatus as another aspect of the present invention includes an image sensor configured to photoelectrically convert an object image formed via an image pickup optical system to output an image signal, a defocus amount detection unit configured to detect a defocus amount by using a focus signal obtained via the image pickup optical system, a light source detection unit configured to detect light source information relating to a light source that illuminates an object by using light from the object obtained via the image pickup optical system, an acquisition unit configured to acquire the light source information from the light source detection unit, a setting unit configured to set correction information of the defocus amount corresponding to the light source information according to an operation by a user, a memory unit configured to store the light source information and the correction information while being correlated with each other, and a control unit configured to perform focus control based on the correction information correlated with the light source information.

A control method as another aspect of the present invention includes the steps of acquiring light source information relating to a light source that illuminates an object, setting correction information of a defocus amount corresponding to the light source information according to an operation by a user, and storing the light source information and the correction information while being correlated with each other.

A non-transitory computer-readable storage medium as another aspect of the present invention stores a program causing a computer to execute a process including the steps of acquiring light source information relating to a light source that illuminates an object, setting correction information of a defocus amount corresponding to the light source information according to an operation by a user, and storing the light source information and the correction information while being correlated with each other.

Further features and aspects of the present invention will become apparent from the following description of exemplary embodiments with reference to the attached drawings.

DESCRIPTION OF THE EMBODIMENTS

Exemplary embodiments of the present invention will be described below with reference to the accompanied drawings. Sizes, shapes, and relative arrangements of components exemplified in this embodiment may be changed appropriately according to a configuration of an apparatus to which the present invention is applied or various kinds of conditions, and thus the present invention is not limited to the exemplary embodiments.

An image pickup apparatus in this embodiment includes a focus detection system including a sensor which detects a defocus amount, and an image pickup system including a sensor which captures an image. In a typical silver-salt film, spectral sensitivity characteristics of the image pickup system are commonly most sensitive to light with a wavelength around 400 to 650 nm in order to have color reproducibility in accordance with characteristics of human eyes. The sensor of the image pickup system (image sensor such as a CMOS sensor) has typically a sensitivity peak at around 800 nm, and it has a sensitivity up to 1100 nm at a long wavelength side. However, in order to emphasize the color reproducibility, light with a wavelength outside the frequency range is designed to be cut off by using an optical filter at the sacrifice of the sensitivity.

On the other hand, the sensor of the focus detection system has a sensitivity up to around 1100 nm similarly to the sensor of the image pickup system. However, if focus control cannot be performed in a low luminance situation, near-infrared auxiliary light (with a wavelength around 700 nm) is illuminated from the image pickup apparatus onto an object. Accordingly, the sensor of the focus detection system has a sensitivity up to a wavelength band which includes a longer wavelength by around 100 nm than that in the sensor of the image pickup system.

Figure 6:
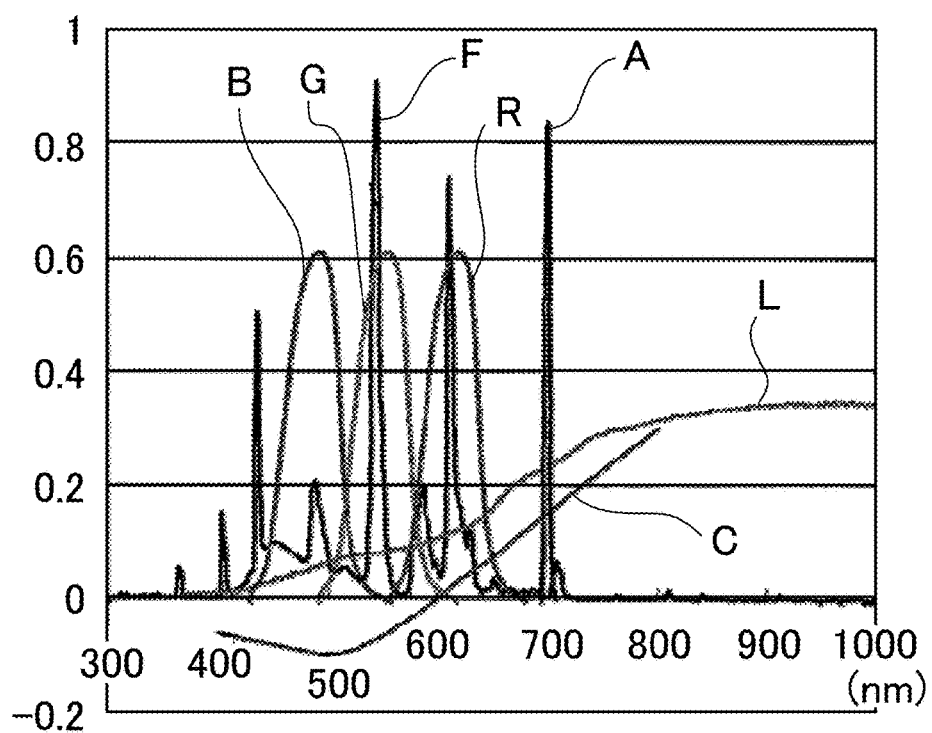
FIG. 6 is a diagram of illustrating each of spectral sensitivities of a light source, an image pickup element, and auxiliary light.

FIG. 6 is a diagram of illustrating each of spectral sensitivities of the light source, the image sensor, and the auxiliary light, and a horizontal axis indicates a wavelength (nm) and a vertical axis indicates a relative energy (sensitivity) or a relative focus position by the chromatic aberration of the image pickup lens. In FIG. 6, symbol C denotes the chromatic aberration of the image pickup lens, symbols B, G, and R denote spectral sensitivities of a blue pixel, a green pixel, and a red pixel of the image sensor, respectively, symbols F, L, and A denote spectral sensitivities of a fluorescent, a photoflood lamp, and the auxiliary light, respectively.

As illustrated in FIG. 6, the fluorescent (F) does not substantially include a wavelength component which is longer than 620 nm, while the photoflood lamp (L) increases its relative sensitivity with a longer wavelength. On the other hand, the chromatic aberration C of the image pickup lens changes a focus position depending on a wavelength, so that it changes in a direction in which a focal length increases at the long wavelength side. Accordingly, when the sensor for autofocus detection (auxiliary light (A)) which has a maximum sensitivity at a wavelength of 700 nm is used, the detected focus positions are different between the fluorescent (F) that has a small amount of the long wavelength component and the photoflood lamp (L) that has the relative sensitivity with a longer wavelength. As a result, the focus point is displaced (i.e., shifted) at the imaging plane.

In order to solve the problem, this embodiment sets a correction value of a defocus amount depending on a type of a light source that illuminates an object, and accordingly it is possible to perform focus control with high accuracy. Hereinafter, an image pickup apparatus of this embodiment will be specifically described.

Figure 1:
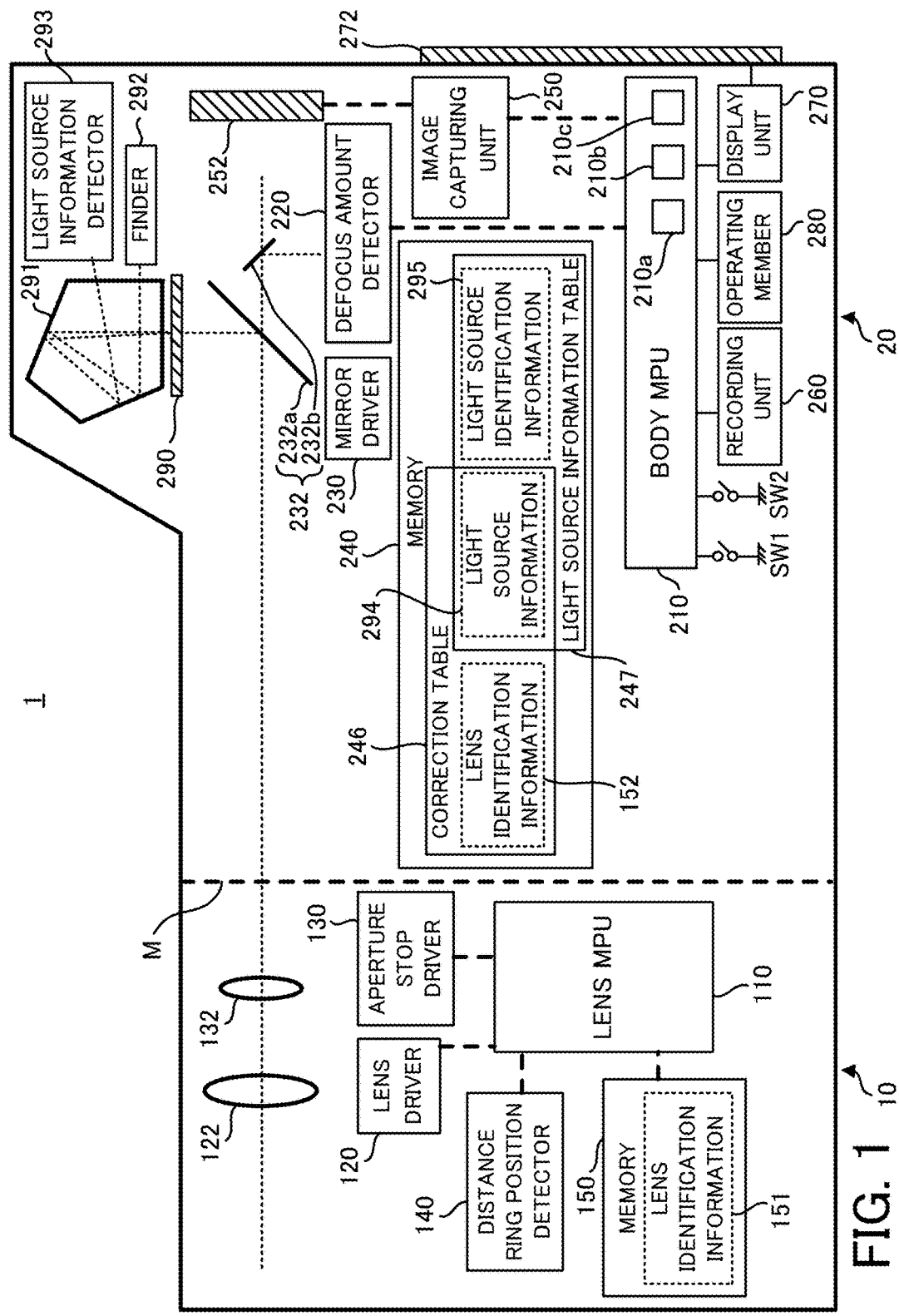
FIG. 1 is a block diagram of an image pickup apparatus in this embodiment.

First of all, referring to FIG. 1, a schematic configuration of the image pickup apparatus in this embodiment will be described. FIG. 1 is a block diagram of an image pickup apparatus 1 in this embodiment. The image pickup apparatus 1 includes an image pickup lens (interchangeable lens) and a body 20 (camera body), and it is an interchangeable lens single-lens reflex camera in which the image pickup lens 10 is removably mounted on the body 20. The body 20 that is used to capture an image of an object has a focusing function that adjusts a focus position of the image pickup lens 10 interchangeably and removably mounted via a mount M. However, this embodiment is not limited thereto, but can be applied also to an image pickup apparatus which includes the image pickup lens 10 and the body 20 integrated with each other.

The image pickup lens 10 includes a lens MPU (micro processing unit) 110, a lens unit 122 including a plurality of lenses, and a lens driver 120 that drives the lens unit 122. The image pickup lens 10 further includes an aperture stop 132 and an aperture stop driver 130 that drives the aperture stop 132. In addition, the image pickup lens 10 includes a distance ring position detector 140 that detects a position of a distance ring (not illustrated) to move a focus lens included in the lens unit 122 by a manual operation, and a memory 150 (memory unit) including a non-volatile memory such as an EEPROM. The memory 150 stores lens identification information 151 (lens ID) that is unique to identify (a type of) the image pickup lens 10 individually. The lens identification information 151 stored in the memory 150 can be sent to the body 20 via the lens MPU 110 that is capable of communicating with a body MPU 210. The lens identification information 151 sent to the body 20 is stored as lens identification information 152 in a correction table 246 of a memory 240 (memory unit).

The body 20 includes a quick return mirror 232 including a main mirror 232a and a sub mirror 232b. The quick return mirror 232 is obliquely provided in an imaging optical path in a finder observation state, and it is retreated outside the imaging optical path in an image capturing state. The main mirror 232a is a half mirror, and it causes approximately half of a ray from an object to transmit toward a focus detection optical system described below when it is obliquely provided in the imaging optical path. An image sensor 252 (image pickup element) photoelectrically converts an object image (optical image) formed via the image pickup lens 10 (image pickup optical system) to output an image signal. A display panel 272 displays a captured image, various kinds of setting information, and the like.

The body 20 includes a focusing plate 290, a pentaprism 291, a finder 292, and a light source information detector 293. Light incident on the pentaprism 291 is split to enter both of the finder 292 and the light source information detector 293. The light source information detector 293 includes a sensor which detects a color temperature and a brightness (type of a light source) of incident light, and it outputs a value which represents the light source of the incident light (i.e., light source information indicating the type of the light source) to the body MPU 210.

The body 20 includes the body MPU 210 (controller, or processor), a defocus amount detector 220, a mirror driver 230, the memory 240, an image capturing unit 250, a recording unit 260, a display unit 270, and an operating member 280. In this embodiment, a control apparatus is constituted by the body MPU 210 and the memory 240. In this embodiment, the memory 240 is provided outside the body MPU 210, and alternatively the memory 240 may be included in the body MPU 210. The body MPU 210 includes an acquirer 210a (acquisition unit), a setter 210b (setting unit), and a controller 210c (control unit). The acquirer 210a acquires light source information 294 relating to the light source (type of the light source) that illuminates an object. The setter 210b sets correction information (micro-adjustment correction value) of a defocus amount corresponding to the light source information 294 according to an operation by a user via the operating member 280. The controller 210c performs focus control based on the correction information correlated with the light source information 294.

The defocus amount detector 220 (defocus amount detection unit) detects a defocus amount by using a focus signal obtained via the image pickup lens 10. The light source information detector 293 (light source detection unit) detects the light source information relating the light source that illuminates the object by using light from the object obtained via the image pickup lens 10.

The user can confirm the light source information detected by a light source information detector 293 described below by using the operating member 280 and the display unit 270. Furthermore, the user can arbitrarily set a name to be easily identified as a name of the light source information (light source identification information 295) by using the operating member 280 and the display unit 270 to be stored in a light source information table 247 of the memory 240 while being correlated with the light source information 294. In the light source information table 247, a plurality of pieces of the light source identification information 295 can be registered for apiece of the light source information 294 (a specific type of the light source).

The memory 240 is constituted by a non-volatile memory such as an EEPROM, and it stores a correction value (correction information) that is used to correct the defocus amount detected by the defocus amount detector 220. In this case, the memory 240 stores the correction value for each combination of the lens identification information 151 of the image pickup lens 10 which has ever been mounted on the body 20 (i.e., lens identification information 152 stored in the memory 240) and the light source information 294 detected by the light source information detector 293. The correction value (correction information) that is used to correct the defocus amount detected by the defocus amount detector 220 means a correction value (micro-adjustment correction value) which is arbitrarily settable according to an input (operation) by the user. In this embodiment, a correction table 246 in which the lens identification information 152, the light source information 294 detected by the light source information detector 293, and the micro-adjustment correction value (correction information) are correlated with each other as a combination is stored in the memory 240. In the factory shipment, an initial value (for example, all zero) indicating that the correction table 246 is not yet set is set in the correction table 246.

The image capturing unit 250 outputs charges accumulated in the image sensor 252 to the body MPU 210 as image signals (image data). The recording unit 260 records the image captured by the image sensor 252 as an image file in a recording medium. The display unit 270 has a function of displaying an image corresponding to the image file recorded in the recording medium, a setting screen, the lens identification information 152, the light source information 294 detected by the light source information detector 293, the light source identification information 295 set by the user, and the like on the display panel 272. The display panel 272 is a display which displays the light source information stored in the memory 240 and the correction information correlated with the light source information at the same time.

The operating member 280 includes a button or a dial which is used to set an operation relating to the image capturing (for example, a shutter speed, an aperture value, and an image capturing mode) of the image pickup apparatus 1, and a release button which is used to instruct the image capturing. The release button includes a switch SW1 for preparing the image capturing which is in an ON state by a half press, and a switch SW2 for starting the image capturing which is in an ON state by a full depression. Furthermore, the operating member 280 includes operating members such as a micro-adjustment setting switch and a micro-adjustment correction value inputting dial to perform operations relating to the setting of the micro-adjustment correction value and the setting of the light source identification information 295 by the user.

In this configuration, the image pickup apparatus 1 starts a focusing operation (focusing function) when the switch SW1 is in the ON state (turned on). Specifically, first, the body MPU 210 sends a lens drive instruction to the lens MPU 110 according to an output (defocus amount) from the defocus amount detector 220. Then, the lens MPU 110 controls the lens driver 120 based on the lens drive instruction sent from the body MPU 210, and thus it performs focusing by driving the distance ring of the image pickup lens 10. Furthermore, when the switch SW2 is in the ON state, the body MPU 210, the image capturing unit 250, the lens MPU 110, the aperture stop driver 130, and the like perform a series of operations to capture an image of the object. When the switch SW1 is in an OFF state (turned off), the image pickup apparatus 1 stops the focusing function.

Even if the defocus amount detected by the focusing operation is zero, the object does not necessarily exist at an in-focus position of the focus lens depending on a tolerance of the focus detection system or the like. Accordingly, it is necessary to store, in the memory 240, an adjustment value to adjust the defocus amount obtained by the body MPU 210 and the defocus amount detector 220 to zero while the object is in focus on the image sensor 252.

Specifically, first, a flange back of the image pickup apparatus 1 (i.e., distance from the image pickup lens 10 (mount M) to the image sensor 252 (imaging plane)) is measured to obtain a displacement (shift amount) of the flange back from a designed value. Next, a reference lens in which a focus position is previously adjusted to an object (reference object) located at a known distance is mounted, and a defocus amount of the reference object is detected. Then, the adjustment value that is used to adjust the detected defocus amount to zero is stored in the memory 240. During the focusing operation, a value obtained by adding the adjustment value stored in the memory 240 to the defocus amount (detected defocus amount) detected by and output from the defocus amount detector 220 is used as a defocus amount (adjusted defocus amount). As a result, it is possible to perform the focusing (focus detection) while an individual difference of the image pickup apparatus 12 is absorbed.

In this embodiment, the image pickup apparatus further adds a best focus correction value and the micro-adjustment correction value to the defocus amount (adjusted defocus amount), which is stored in the memory 240, obtained by adding the adjustment value to calculate a corrected defocus amount.

The best focus correction value is a correction value with respect to a displacement (shift amount) between a focus point of an object light beam in the photographing and a focus point of an object light beam by the focus detection optical system. The displacement between the focus point of the object light beam in the photographing and the focus point of the object light beam by the focus detection optical system is caused by a difference of the spectral sensitivity between the image sensor 252 and the defocus amount detector 220 and by a spherical aberration of the image pickup lens 10, and accordingly it is different in each distance ring position of the image pickup lens 10. The displacement caused by the difference of the spectral sensitivities of the image sensor 252 and the defocus amount detector 220 varies depending on a type of the light source that illuminates a target to be captured (object). In this embodiment, the best focus correction value is stored in the lens MPU 110 of the image pickup lens 10 mounted on the body 20. The lens MPU 110 sends the best focus correction value which corresponds to a current distance ring position output from the distance ring position detector 140 to the body MPU 210 of the body 20. The body MPU 210 sets (determines), as a defocus amount, a value obtained by adding the best focus correction value to the adjusted defocus amount, and accordingly it is possible to perform optimum focusing (focus detection) for each image pickup lens 10.

The micro-adjustment correction value is a correction value that the user can arbitrarily set for each light source information detected by the light source information detector 293 in order to correct the defocus amount. In the interchangeable lens single-lens reflex camera as described in this embodiment, it is a correction value that the user can arbitrarily set for each image pickup lens 10 mounted on the body 20 (i.e., according to the identification of the image pickup lens 10).

Figure 2:
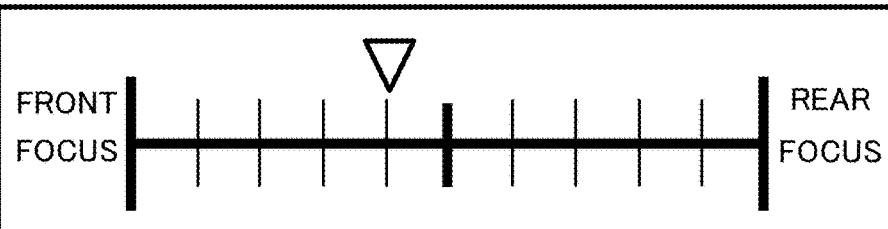
FIG. 2 is an exemplary setting screen of a micro-adjustment correction value in this embodiment.

Next, referring to FIG. 2, a method of setting the micro-adjustment correction value (correction value or correction information) will be described. FIG. 2 is an exemplary setting screen of the micro-adjustment correction value in this embodiment. As illustrated in FIG. 2, the user can arbitrarily set the micro-adjustment correction value by operating the micro-adjustment correction value inputting dial that constitutes a part of the operating member 280 in the setting screen displayed on the display panel 272.

The setting screen illustrated in FIG. 2 displays the entry number "No. 5" in the correction table 246, the model name "SNS300 mm/2.8 SCM" of the image pickup lens 10, and the number "#2" which identifies the image pickup lens 10 with the same model name. Furthermore, the setting screen of FIG. 2 displays light source information "LIGHT SOURCE VALUE: 300" detected by the light source information detector 293 and light source identification information "SKATING RINK" that the user can easily identify the light source information "LIGHT SOURCE VALUE: 300". The number of specifying the image pickup lens 10 with the same model name is sequentially allocated to the image pickup lens 10 which is matched by the search in the correction table 246 by using the model name of the image pickup lens 10.

On the setting screen illustrated in FIG. 2, a current micro-adjustment correction value is displayed by using a triangle mark above a scale bar. The user can change the micro-adjustment correction value in a front focus direction (i.e., a direction in which a focus position is in front of an object) or a rear focus direction (i.e., a direction in which the focus position is behind the object) by operating the micro-adjustment correction value inputting dial. The light source identification information 295 is arbitrarily settable in response to the operation by the user via the operating member 280.

The micro-adjustment correction value input by the user in the setting screen of FIG. 2, as well as the lens identification information 152 of the image pickup lens 10 and the light source information 294 are written as correction data in the correction table 246. Then, the body MPU 210 searches the micro-adjustment correction value which corresponds to the combination of the lens identification information 152 of the image pickup lens 10 mounted on the body 20 and the light source information 294 detected by the light source information detector 293 in the correction table 246 of the memory 240. When the body MPU 210 detects the micro-adjustment correction value which corresponds to the combination of the lens identification information 152 of the image pickup lens 10 and the light source information 294, it determines a corrected defocus amount. In other words, the body MPU 210 calculates the defocus amount (corrected defocus amount) obtained by adding the micro-adjustment correction value (correction value or correction information) to the defocus amount (detected defocus amount) detected by the defocus amount detector 220. Accordingly, the image pickup apparatus 1 is capable of performing the focusing arbitrarily depending on the type of the image pickup lens 10 and the light source information 294.

On the other hand, when the micro-adjustment correction value which corresponds to the combination of the lens identification information 152 of the image pickup lens 10 and the light source information 294 is not detected, the body MPU 210 searches the micro-adjustment correction value which corresponds to the lens identification information 152 of the image pickup lens 10. When the micro-adjustment correction value which corresponds to the lens identification information 152 is detected, the body MPU 210 corrects the defocus amount by using a correction value that is most similar to the light source information of the light source information 294 stored in the memory 240. In other words, the body MPU 210 uses the micro-adjustment correction value which corresponds to the light source information that is most similar to the light source information 294 detected by the light source information detector 293 in the stored micro-adjustment correction values which correspond to the lens identification information 152.

Figure 3:
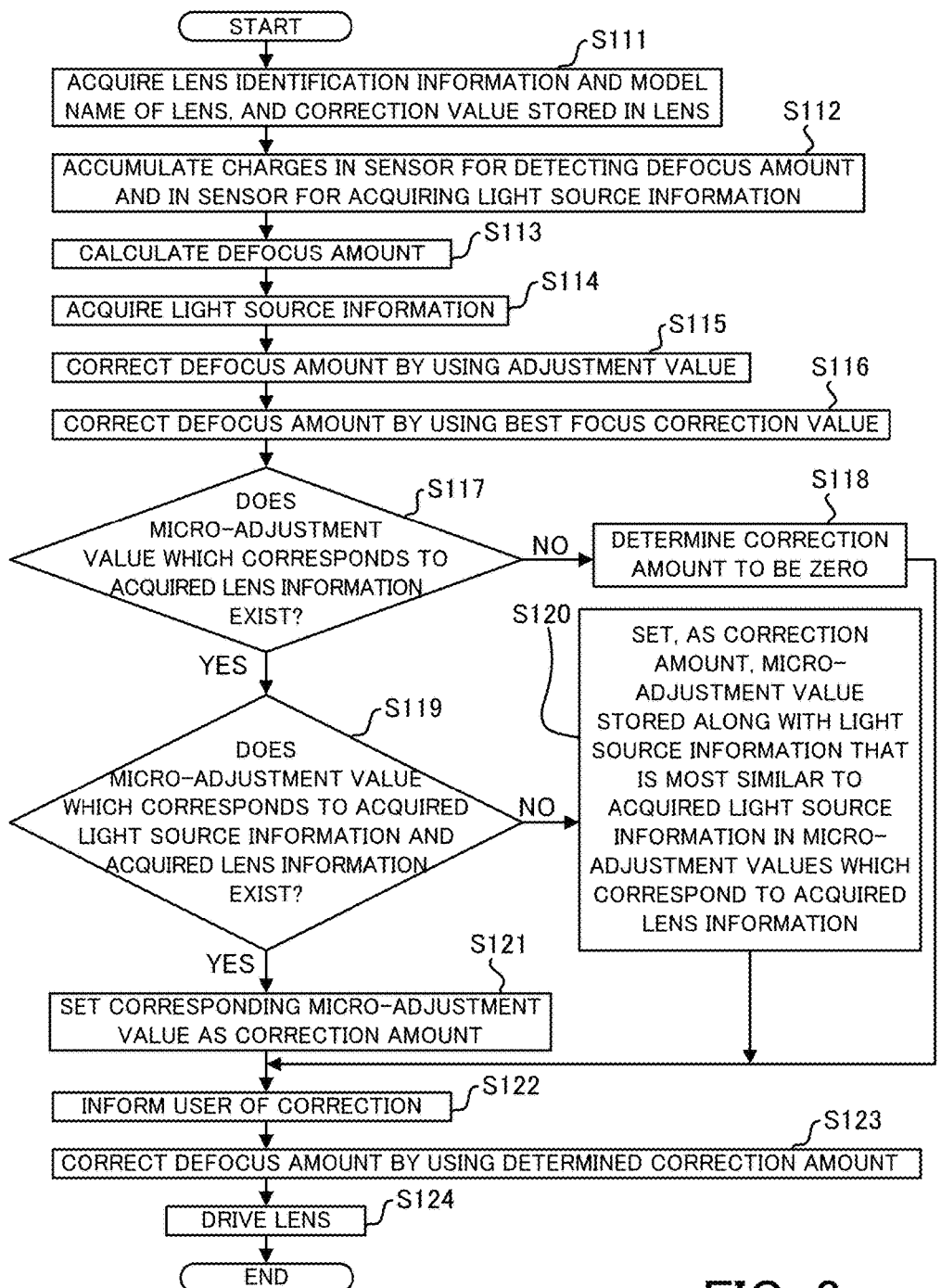
FIG. 3 is a flowchart of illustrating an AF operation in this embodiment.

Next, referring to FIG. 3, a procedure of autofocusing (AF operation) by the image pickup apparatus 1 will be described. FIG. 3 is a flowchart of illustrating the AF operation in this embodiment. The flow of FIG. 3 includes a step of acquiring a defocus amount from the defocus amount detector 220 and a step of correcting the defocus amount by using the adjustment value for each image pickup lens 10, the best focus correction value, and the micro-adjustment correction value. Each step of FIG. 3 is performed by each portion mainly based on an instruction of the body MPU 210.

First, at step S111, the body MPU 210 acquires, via the lens MPU 110, the lens identification information 151 of the image pickup lens 10 mounted on the body 20, a model name of the image pickup lens 10, and the adjustment value and the best focus correction value for each image pickup lens 10. The information is previously stored in the memory 150 of the image pickup lens 10. Subsequently, at step S112, the body MPU 210 drives the quick return mirror 232 such that a light beam is introduced to the defocus amount detector 220 and the light source information detector 293. After the drive of the quick return mirror 232 is completed, charges are accumulated in the defocus amount detection sensor included in the defocus amount detector 220 and the light source information detection sensor included in the light source information detector 293.

Subsequently, at step S113, the defocus amount detector 220 detects the defocus amount based on the charges (focus detection signal) accumulated at step S112. Then, the body MPU 210 acquires the defocus amount (detected defocus amount) calculated by the defocus amount detector 220. Subsequently, at step S114, the light source information detector 293 detects the light source information based on the charges (light source information detection signal) accumulated at step S112. Then, the body MPU 210 acquires the light source information 294 calculated by the light source information detector 293.

Subsequently, at step S115, the body MPU 210 adds the adjustment value for each image pickup lens 10 obtained at step S111 to the defocus amount obtained at step S113 to calculate a new defocus amount (adjusted defocus amount). Subsequently, at step S116, the body MPU 210 adds the best focus correction value obtained at step S111 to the defocus amount obtained at step S115 to calculate a new defocus amount (first corrected defocus amount).

Subsequently, at step S117, the body MPU 210 searches the correction table 246 stored in the memory 240 by using the lens identification information 151 (152) obtained at step S111 as a search key. In other words, the body MPU 210 determines whether the micro-adjustment correction value which corresponds to the lens identification information 151 obtained at step S111 exists in the correction table 246. If the micro-adjustment correction value which corresponds to the lens identification information 151 obtained at step S111 is stored in the correction table 246, the flow proceeds to step S119.

On the other hand, if the micro-adjustment correction value which corresponds to the lens identification information 151 obtained at step S111 is not stored in the correction table 246, the flow proceeds to step S118. At step S118, the body MPU 210 determines that a correction amount is zero since the micro-adjustment correction value is not stored in the correction table 246 at step S117.

At step S119, the body MPU 210 searches the correction table 246 stored in the memory 240 by using the lens identification information 151 obtained at step S111 and the light source information 294 obtained at step S114 as search keys. In other words, the body MPU 210 determines whether the micro-adjustment correction value which corresponds to a combination (pair) of the lens identification information 151 obtained at step S111 and the light source information 294 obtained at step S114 exists in the correction table 246. If the micro-adjustment correction value which corresponds to the combination of the lens identification information 151 obtained at step S111 and the light source information 294 obtained at step S114 is stored in the correction table 246, the flow proceeds to step S121.

On the other hand, if the micro-adjustment correction value which corresponds to the combination of the lens identification information 151 and the light source information 294 is not stored in the correction table 246, the flow proceeds to step S120. In this case, the micro-adjustment correction value which corresponds to the combination of the lens identification information 151 and the light source information 294 is not stored in the correction table 246 at step S119. On the other hand, the micro-adjustment correction value which corresponds to the lens identification information 151 is stored in the correction table 246 at step S117. Accordingly, at step S120, the body MPU 210 sets (determines), as a correction amount, a micro-adjustment correction value, which is stored, corresponding to light source information that is most similar to the light source information 294 in the micro-adjustment correction values, which are stored, corresponding to the lens identification information 151.

At step S121, the micro-adjustment correction value which corresponds to the combination of the lens identification information 151 and the light source information 294 is stored in the correction table 246. Accordingly, the body MPU 210 sets (determines), as the correction amount, the micro-adjustment correction value which corresponds to the combination of the lens identification information 151 and the light source information 294.

Subsequently, at step S122, the body MPU 210 informs the user, via the display unit 270, of the correction amount (correction information) determined at step S118, S120, or S121. Subsequently, at step S123, the body MPU 210 adds the correction value determined at step S118, S120, or S121 to the defocus amount obtained at step S116 to calculate a new defocus amount (second corrected defocus amount).

Then, at step S124, the body MPU 210 informs the lens MPU 110 that is provided in the image pickup lens 10 mounted on the body 20 of the defocus amount (second corrected defocus amount) obtained at step S123 and the lens drive instruction. The lens MPU 110 drives the focus lens included in the lens unit 122 via the lens driver 120 by the informed defocus amount (second corrected defocus amount).

As described above, the image pickup apparatus 1 (body MPU 210) of this embodiment corrects the defocus amount detected by the defocus amount detector 220 based on the micro-adjustment correction value in performing the focusing operation (AF operation). The micro-adjustment correction value is a correction value, which is stored in the memory 240, corresponding to the combination of the lens identification information 151 of the image pickup lens 10 mounted on the body 20 and the light source information 294 detected by the light source information detector 293. Then, the body MPU 210 adjusts the focus position of the image pickup lens 10 such that the corrected defocus amount is zero. Accordingly, when the image capturing is performed under a plurality of different light sources (i.e., under the image capturing environment where types of the light sources illuminating the object are different from each other), each piece of the light source information can be identified to perform the focusing (focus control) which is appropriate for each light source that illuminates the object.

Figure 4:
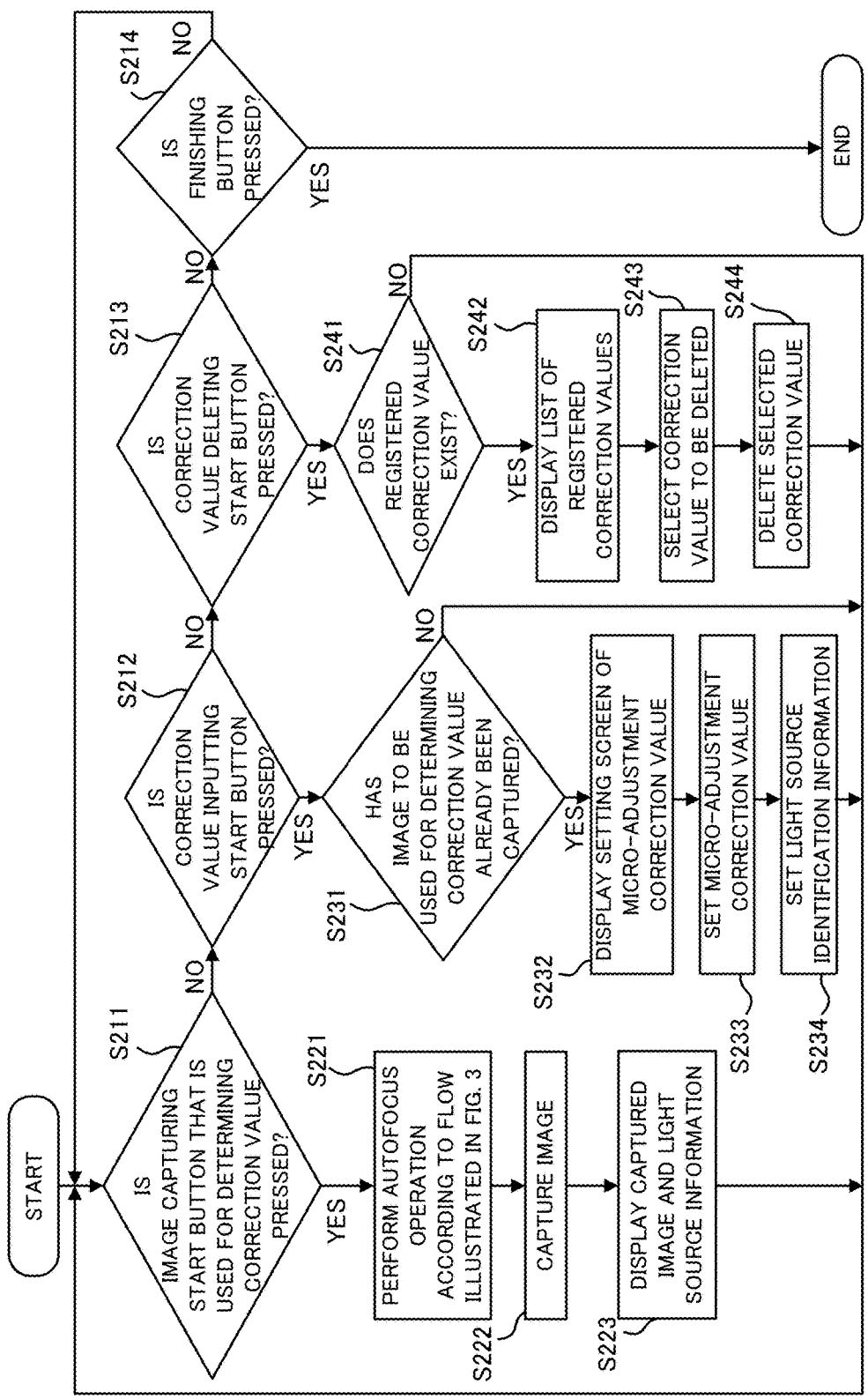
FIG. 4 is a flowchart of illustrating a setting operation of the micro-adjustment correction value in this embodiment.

Next, referring to FIG. 4, a procedure of setting the micro-adjustment correction value in the image pickup apparatus 1 will be described. FIG. 4 is a flowchart of illustrating a setting operation of the micro-adjustment correction value in this embodiment. As illustrated in FIG. 4, the setting operation of the micro-adjustment correction value includes steps of capturing an image to be used for determining a correction value, determining the correction value, and storing light source information named by the user, as well as the correction value, in the correction table. The setting operation of the micro-adjustment correction value starts when the user operates (presses) the micro-adjustment setting switch that constitutes a part of the operating member 280. Each step in FIG. 4 is performed mainly by each portion based on an instruction of the body MPU 210.

At steps S211 to S214, the body MPU 210 determines whether the user is to perform any one of steps of capturing the image to be used for determining the correction value, determining the correction value, deleting the correction value, and finishing the setting operation of the correction value. First, at step S211, the body MPU 210 determines whether an image capturing start button that constitutes a part of the operating member 280 is pressed. When the image capturing start button is pressed, the flow proceeds to step S221. At step S221, the body MPU 210 starts the step of capturing the image to be used for determining the micro-adjustment correction value (correction value or correction information).

On the other hand, when the image capturing start button is not pressed at step S211, the flow proceeds to step S212. At step S212, the body MPU 210 determines whether a correction value inputting start button that constitutes apart of the operating member 280 is pressed. When the correction value inputting start button is pressed at step S212, the flow proceeds to step S231. At step S231, the body MPU 210 starts the step of determining the correction value.

On the other hand, when the correction value inputting start button is not pressed at step S212, the flow proceeds to step S213. At step S213, the body MPU 210 determines whether a correction value deleting start button that constitutes a part of the operating member 280 is pressed. When the correction value deleting start button is pressed at step S213, the flow proceeds to step S241. At step S241, the body MPU 210 starts the step of deleting the correction value.

On the other hand, when the correction value deleting start button is not pressed at step S213, the flow proceeds to step S214. At step S214, the body MPU 210 determines whether a finishing button that constitutes a part of the operating member 280. When the finishing button is pressed at step S214, the setting operation of the micro-adjustment correction value is finished. On the other hand, when the finishing button is not pressed at step S214, the flow returns to step S211, and each step described above is repeated until anyone of the image capturing start button, the correction value inputting start button, the correction value deleting start button, and the finishing button is pressed.

At step S221, the body MPU 210 performs the focusing operation (AF operation) according to the flowchart illustrated in FIG. 3. In this case, the body MPU 210 acquires the light source information detected by the light source information detector 293 and the lens identification information 151 of the image pickup lens 10 mounted on the body 20. The information acquired by the body MPU 210 is temporarily stored in the memory 240.

Subsequently, at step S222, the body MPU 210 captures an image. In other words, the body MPU 210 controls the mirror driver 230 to drive the quick return mirror 232 so as to introduce a light beam into the image sensor 252, and it outputs, as an image (captured image), charges accumulated in the image sensor 252 from the image capturing unit 250. Next, the body MPU 210 records, via the recording unit 260, the captured image as an image file in a recording medium.

Figure 5:
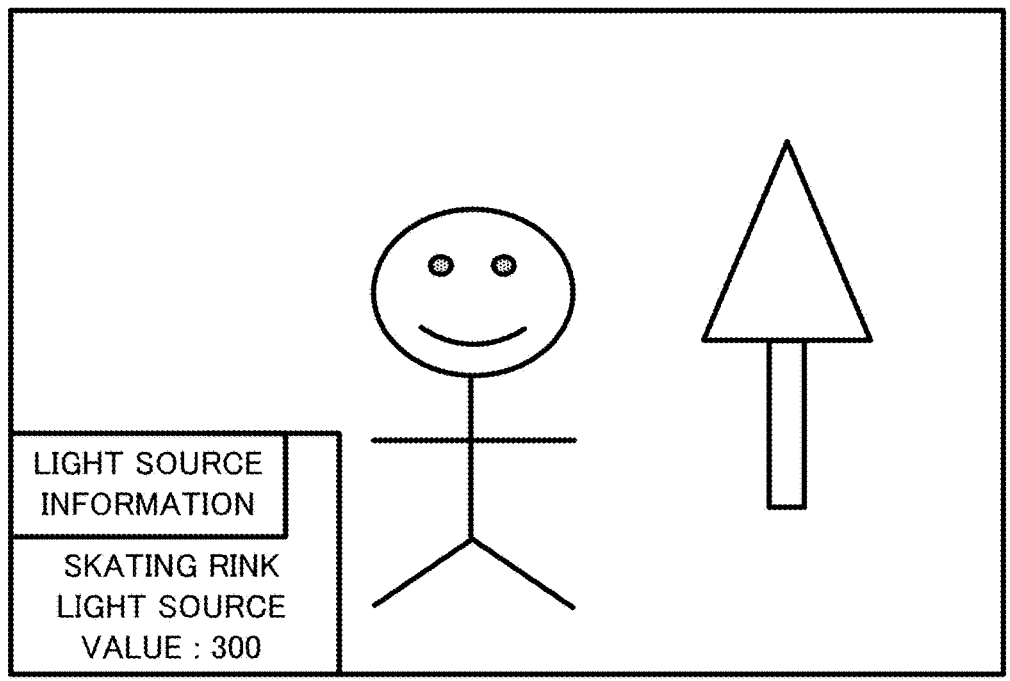
FIG. 5 is an exemplary display screen for determining the micro-adjustment correction value in this embodiment.

At step S223, the body MPU 210 displays the image captured at step S222 and the light source information acquired at step S221 on the display panel 272 via the display unit 270. FIG. 5 is a diagram of illustrating an exemplary display screen in which the image captured for determining the correction value and the light source information acquired in capturing the image are displayed. When the light source identification information 295 which corresponds to the light source information 294 acquired in capturing the image exists in the light source information table 247, the light source identification information 295 is also displayed at the same time. The display screen illustrated in FIG. 5 includes light source information "LIGHT SOURCE VALUE: 300" detected by the light source information detector 293 and light source identification information "SKATING RINK" for causing the user to easily identify the light source information "LIGHT SOURCE VALUE: 300".

When the correction value inputting start button (start button for inputting the micro-adjustment correction value) is pressed at step S212 in FIG. 4, the body MPU 210 starts the step of inputting the correction value. First, at step S231, the body MPU 210 determines whether the step (steps S221 to S223) of capturing the image to be used for determining the correction value has been performed at least once (i.e., whether the image has been already captured). When the step of capturing the image to be used for determining the correction value has not yet been performed, the step of inputting the correction value is finished, and the flow proceeds to step S211. On the other hand, when the step of capturing the image to be used for determining the correction value has been performed at least once, the flow proceeds to step S232.

At step S232, the body MPU 210 displays the setting screen of the micro-adjustment correction value on the display panel 272 via the display unit 270. In this embodiment, the setting screen as illustrated in FIG. 2 is displayed, and the lens identification information 152 and the light source information 294 obtained at step S221 are displayed. In this case, the body MPU 210 searches the light source information table 247 by using the light source information 294 ("LIGHT SOURCE VALUE: 300") as a search key, and it determines whether the light source identification information 295 ("SKATING RINK") which is previously registered exists in the light source information table 247. When the registered light source identification information 295 exists, the light source identification information 295 is displayed on the setting screen as well.

Subsequently, at step S233, the user operates the micro-adjustment correction value inputting dial (operating member 280), and the body MPU 210 sets the micro-adjustment correction value in response to the operation by the user. Subsequently, at step S234, the user inputs the light source identification information 295 which corresponds to the light source information 294 obtained at step S221 by using the operating member 280 and the display unit 270, and the body MPU 210 sets the light source identification information 295 in response to the operation by the user. In this case, the user can arbitrarily set information that the user is able to identify the light source information later, such as a place and a time at which the light source information is acquired. Accordingly, the user can easily specify the set value and the light source information later.

When the correction value deleting start button is pressed at step S213, the body MPU 210 starts the step of deleting the correction value. First, at step S241, the body MPU 210 determines whether the registered correction value exists in the correction table 246. When the registered correction value does not exist in the correction table 246, the step of deleting the correction value is finished, and the flow proceeds to step S211. On the other hand, when the registered correction value exists in the correction table 246, at step S242, the body MPU 210 displays the light source information, the light source identification information, and the lens identification information which correspond to the registered correction value in the correction table 246 on the display panel 272 via the display unit 270. Subsequently, at step S243, the user selects a correction value to be deleted from the correction table 246 by using the operating member 280 and the display unit 270. Subsequently, at step S244, the body MPU 210 deletes the correction value selected by the user at step S243 from the correction table 246.

As described above, the image pickup apparatus 1 of this embodiment stores the micro-adjustment correction value which corresponds to the combination (pair) of the image pickup lens 10 and the light source information while being correlated with the lens identification information 151 that is unique to the image pickup lens 10 and the light source information 294. If data exceeds a storage capacity where the micro-adjustment correction values can be stored, light source identification information and lens identification information set by the user is displayed. Accordingly, it is possible for the user to easily delete unnecessary correction values.

In this embodiment, a control apparatus includes the acquirer 210a (acquisition unit), the setter 210b (setting unit), and the memory 240 (memory unit). The acquirer 210a acquires light source information (light source information 294 or light source identification information 295) relating to a light source (type of the light source) that illuminates an object. The setter 210b sets correction information (micro-adjustment correction value) of a defocus amount corresponding to the light source information according to an operation by a user. The memory 240 stores the light source information and the correction information while being correlated with each other.

Preferably, the setter 210b changes or deletes the correction information when instructed to change or delete the correction information stored in the memory according to the operation by the user (S233, S244). Preferably, the light source information (light source information in a broad sense) includes at least one of information indicating a type of the light source (light source information 294 in a narrow sense) and light source identification information 295 set by the user corresponding to the information indicating the type of the light source.

Preferably, the control apparatus includes a controller 210c (control unit) which performs focus control based on the correction information correlated with the light source information. More preferably, the controller 210c determines a corrected defocus amount based on the correction information correlated with the light source information and the defocus amount (detected defocus amount) calculated by using a focus signal obtained via an image pickup optical system (image pickup lens 10) (S123). Then, the controller 210c performs the focus control so as to decrease the corrected defocus amount (S124). Preferably, the controller 210c informs, via a display (display unit 270, display panel 272), the user of the correction information to be used in the focus control (S122).

Preferably, the controller 210c determines whether first light source information obtained in photographing and first correction information correlated with the first light source information are stored in the memory as the light source information and the correction information, respectively (S119). Then, the controller 210c performs the focus control by using the first correction information when the first light source information and the first correction information correlated with the first light source information are stored in the memory (S121). More preferably, the controller 210c performs the focus control by using second correction information correlated with second light source information that is most similar to the first light source information of the correction information stored in the memory when the first correction information is not stored in the memory (S120).

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

For example, the present invention is not limited to an interchangeable lens single-lens reflex camera, and it is applied also to other optical apparatuses such as a digital still camera with a lens and a video camera each having a focus detection apparatus.

This application claims the benefit of Japanese Patent Application No. 2015-090075, filed on Apr. 27, 2015, which is hereby incorporated by reference herein in its entirety.

What is claimed is:

1. A control apparatus comprising:
a non-transitory memory storing a program; and
a processor configured to execute the program stored in the non-transitory memory to implement an acquisition unit, a setting unit, and a control unit,
wherein:
the acquisition unit is configured to acquire light source information relating to a light source that illuminates an object,
the setting unit is configured to set correction information of a defocus amount corresponding to the light source information according to an operation by a user,
the non-transitory memory is configured to store the light source information and the correction information correlated with each other, and
the control unit is configured to perform focus control based on the correction information correlated with the light source information, and
wherein the control unit is configured to:
determine whether first light source information obtained in photographing and first correction information correlated with the first light source information are stored in the non-transitory memory as the light source information and the correction information, respectively, and
perform the focus control by using the first correction information when the first light source information and the first correction information correlated with the first light source information are stored in the non-transitory memory.

2. The control apparatus according to claim 1, wherein the setting unit is configured to change or delete the correction information when instructed to change or delete the correction information stored in the non-transitory memory according to the operation by the user.

3. The control apparatus according to claim 1, wherein the light source information includes at least one of information indicating a type of the light source and light source identification information set by the user corresponding to the information indicating the type of the light source.

4. The control apparatus according to claim 1, wherein the control unit is configured to:
  determine a corrected defocus amount based on the correction information correlated with the light source information and the defocus amount calculated by using a focus signal obtained via an image pickup optical system, and
  perform the focus control so as to decrease the corrected defocus amount.

5. The control apparatus according to claim 1, wherein the control unit is configured to inform, via a display, the user of the correction information to be used in the focus control.

6. The control apparatus according to claim 1, wherein the control unit is configured to perform the focus control by using second correction information correlated with second light source information that is most similar to the first light source information of the correction information stored in the non-transitory memory when the first correction information is not stored in the non-transitory memory.

7. An image pickup apparatus comprising:
  an image sensor configured to photoelectrically convert an object image formed via an image pickup optical system to output an image signal;
  a defocus amount detector configured to detect a defocus amount by using a focus signal obtained via the image pickup optical system;
  a light source detector configured to detect light source information relating to a light source that illuminates an object by using light from the object obtained via the image pickup optical system;
  a non-transitory memory storing a program; and
  a processor configured to execute the program stored in the non-transitory memory to implement an acquisition unit, a setting unit, and a control unit,
  wherein:
    the acquisition unit is configured to acquire the light source information from the light source detector,
    the setting unit is configured to set correction information of the defocus amount corresponding to the light source information according to an operation by a user,
    the non-transitory memory is configured to store the light source information and the correction information correlated with each other, and
    the control unit is configured to perform focus control based on the correction information correlated with the light source information, and
  wherein the control unit is configured to:
    determine whether first light source information obtained in photographing and first correction information correlated with the first light source information are stored in the non-transitory memory as the light source information and the correction information, respectively, and
    perform the focus control by using the first correction information when the first light source information and the first correction information correlated with the first light source information are stored in the non-transitory memory.

8. The image pickup apparatus according to claim 7, further comprising a display configured to display the light source information stored in the non-transitory memory and the correction information correlated with the light source information at the same time,
  wherein the setting unit is configured to change or delete the correction information when instructed to change or delete the correction information displayed on the display according to the operation by the user.

9. A control method comprising the steps of:
  acquiring light source information relating to a light source that illuminates an object;
  setting correction information of a defocus amount corresponding to the light source information according to an operation by a user;
  storing, in a memory, the light source information and the correction information correlated with each other; and
  performing focus control based on the correction information correlated with the light source information,
  wherein the step of performing the focus control includes:
    determining whether first light source information obtained in photographing and first correction information correlated with the first light source information are stored in the memory as the light source information and the correction information, respectively, and
    performing the focus control by using the first correction information when the first light source information and the first correction information correlated with the first light source information are stored in the memory.

10. The control method according to claim 9, wherein the step of setting the correction information includes:
  capturing an image, and
  displaying the image and the light source information determined in capturing the image at the same time.

11. A non-transitory computer-readable storage medium which stores a program causing a computer to execute a process comprising the steps of:
  acquiring light source information relating to a light source that illuminates an object;
  setting correction information of a defocus amount corresponding to the light source information according to an operation by a user;
  storing, in a memory, the light source information and the correction information correlated with each other; and
  performing focus control based on the correction information correlated with the light source information,
  wherein the step of performing the focus control includes:
    determining whether first light source information obtained in photographing and first correction information correlated with the first light source information are stored in the memory as the light source information and the correction information, respectively, and
    performing the focus control by using the first correction information when the first light source information and the first correction information correlated with the first light source information are stored in the memory.

* * * * *